May 5, 1931.  C. E. VAN NORMAN  1,803,984
BENCH TOOL
Filed Aug. 15, 1927   3 Sheets-Sheet 3
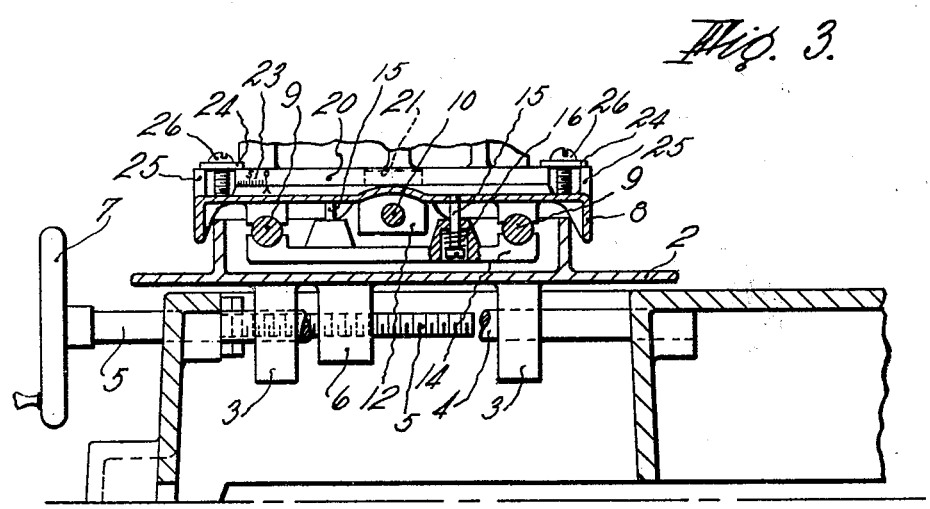
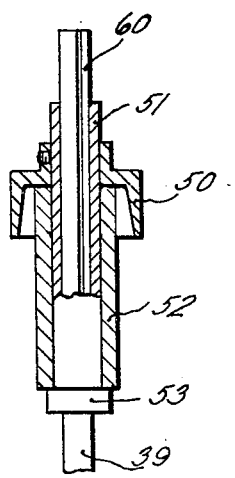
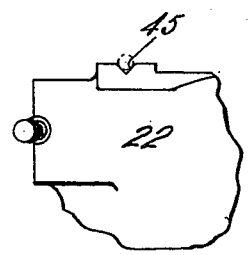
INVENTOR.
CHARLES E. VAN NORMAN
BY Chapin + Neal
ATTORNEYS.

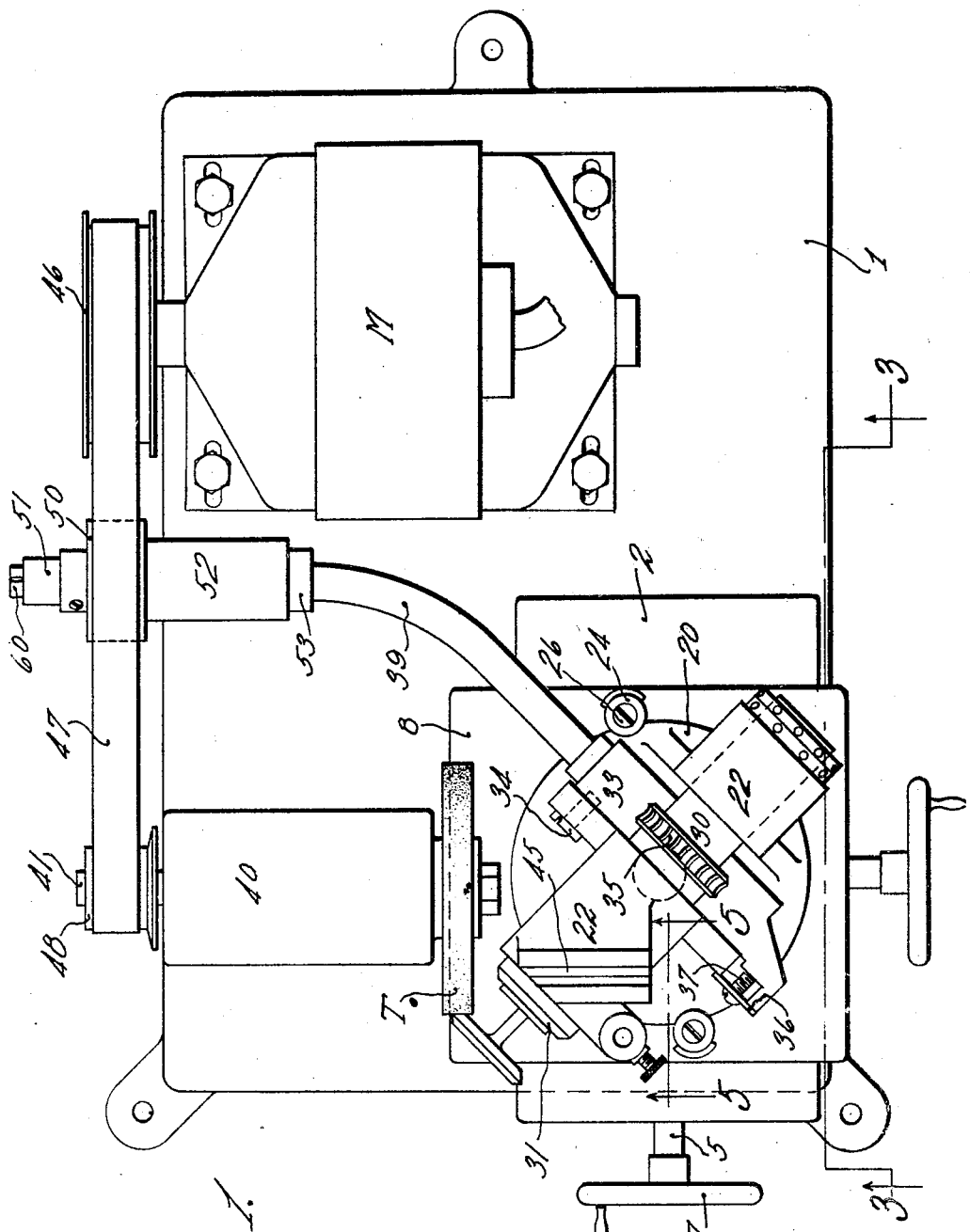

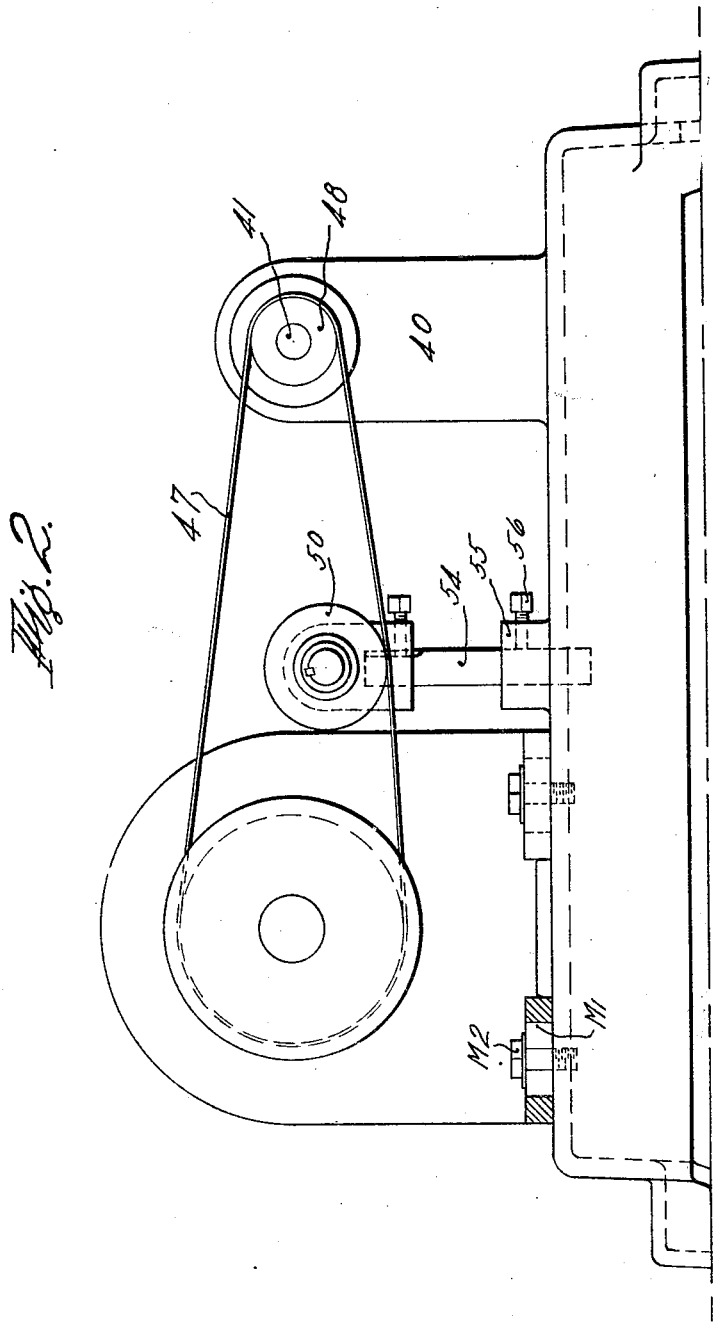

Patented May 5, 1931

1,803,984

UNITED STATES PATENT OFFICE

CHARLES E. VAN NORMAN, OF SPRINGFIELD, MASSACHUSETTS

BENCH TOOL

Application filed August 15, 1927. Serial No. 213,048.

This invention relates to improvements in machine tools and particularly to improvements in so-called bench tools which are adapted for repair garages and the like.

Bench tools are commonly used by garages for doing what might be called short jobs, such as refacing valves and the like, and are not ordinarily in operation for long periods of time as is a machine tool in a machine shop. Consequently, in order that they may be available to the ordinary garage or repair shop, they must be low in cost, simple in construction, adapted for doing a variety of work and made to occupy but small space on a bench or the like.

Bench tools of the prior art usually comprise work and tool carrying spindles which are driven by belts from a motor or other power unit, while belt tighteners in the form of adjustable idler pulleys are employed for tensioning the belts. The construction just briefly described entails a multiplicity of parts especially in respect to driving belts which not only makes a rather complicated machine but one that is far too costly for the ordinary garage to include in its equipment.

One of the objects of this invention is the provision of a bench tool of the class described which is not only simple in its construction and therefor low in cost, but one which is adapted to adequately perform a large variety of work and is accomplished by the provision of simple and novel mechanism for driving the spindles whereby it is possible to eliminate some of the parts formerly employed in connection with the driving mechanism.

The machine is adapted for use generally in garages and the like where it is desired to have a machine which occupies but a small space and is economical in operation and maintenance while the details of construction may be varied within wide limits to adapt it for various uses.

The form of the invention at present preferred will be described in connection with the accompanying drawings, in which:

Fig. 1 is a plan view of a machine which embodies the features of my invention;

Fig. 2 is a rear elevational view of the same;

Fig. 3 is a sectional elevational view taken on the line 3—3 of Fig. 1;

Fig. 4 is a longitudinal view through the combined idler and driving mechanism; and Fig. 5 is a fragmentary elevational view taken on the line 5—5 of Fig. 1.

Referring to the drawings in detail, a support in the form of a base is shown at 1 which is adapted to support the mechanism of the machine and may be provided with usual lugs or bosses for securing the same to a bench or the like.

A lower slide 2 movable on the base has bosses 3 depending therefrom which are slidable on guide rods 4 fixed to the base 1 and a feed screw 5 screw-threaded in a depending boss 6 of the slide 2 is rotatable in the base while a hand wheel 7 fixed thereon is provided for rotating said screw and moving said slide back and forth along the rods 4.

An upper slide 8 is slidable on rods 9 fixed to the lower slide 2 and a feed screw 10 rotatable in said slide has a threaded end in engagement with a boss 12 depending from the slide 8 so that the slide 8 may be moved back and worth with respect to the slide 2. As will be noted, the rods for one slide are disposed transversely to those for the other so that the slides may be moved independently of and relative to one another and in opposite directions as may be desired.

A plate 14 is provided which underlies the rods 9 and has portions for slidably engaging with the underside of the said rods.

Screws or clamping bolts 15 having their ends threaded in the slide 8 pass loosely through the plate 14 and springs 16 interposed between the underside of the heads of said screws and plate 14 serve to urge the slide and plate towards one another so that they yieldingly embrace the rods and permit a free sliding movement of the slide on the rods. Although not shown, plugs may be carried by the bosses 3 for bearing against the rods 4 and may be of a resilient character or may be spring pressed thereagainst so that the action of the slide 2 on its rods is similar to that of the slide 8.

The guide rod construction described takes the place of the ways usually employed in machine tool construction and serves to properly and adequately guide the slides in their sliding movements. The construction has an advantage, however, over the guideways of the prior art machines in that there are none of the usual gibs for taking up wear, the wear being compensated for by the ability of the slides to fit snugly against their guides and is accomplished by the resilient means which function at all times to urge the slides against their respective rods.

A rotatable tool head comprises a lower circular flange 20 which is pivoted on a stud 21 carried by the upper slide 8 and has upper spindle bearings 22 spaced apart as shown. A series of graduations or designating characters 23 disposed around said flange 20 are arranged to register with an index point such as an arrow on the slide 8, by the means of which the tool head may be set to any definite angular position of adjustment for the purpose later to be described.

Means for clamping the head in an adjusted position comprise clamping washers 24 which have one side bearing on bosses 25 of the slide and adjusting screws 26 for drawing the washers downwardly so as to bind the head to said slide.

A work spindle 30 is rotatable in the bearings 22 of the head and preferably carries on its forward end a chuck 31 or other work holding device of well known form.

A swinging bracket 33 pivoted to one of the bearings 22 as at 34 carries a rotatable driving worm (not shown) which is located just below and arranged for meshing engagement with a worm gear 35 fixed to the spindle 30. The bracket 33 is pivoted for an up and down swinging movement so that the worm thereof may be moved into and out of engagement with the worm gear while a washer 36 and clamping screw 37 are provided for clamping the member in a raised or lowered position to hold the worm and gear in or out of meshing engagement. Driving means for the worm in the form of a flexible shaft 39 has its end suitably supported in the bracket 33 and is connected to the worm. The shaft 39 is rotated according to the novel means later to be described.

A bearing 40 supported by the bed plate and which may be adjustable thereon if desired has a tool spindle 41 rotatable therein which spindle is adapted to carry tools of various forms at one end thereof. In the form shown, the tool T represents a grinding wheel suitable for refacing or machining a piece of work such as a valve or the like.

Since the slides may be moved relative to one another and with respect to the bed and inasmuch as the work head is rotatable on its support, it will be obvious that the work may be moved and positioned with respect to the wheel or other tool as may be desired so that work of various kinds may be machined.

In reconditioning valves and similar objects, it is often desirable to grind off or machine the ends of such objects so that such ends are true or square with respect to their axis. To accomplish this, I provide a guide which is preferably in the form of a channel or groove 45 on the upper side of the work spindle bearing, as shown in Figs. 1 and 5.

When it is desired to square off the end of an object such as a valve stem, the stem is laid in the guide 45 and the work head positioned so that the axis of the valve stem is disposed at right angles to the face of the wheel T. The graduations and index point may be arranged so that a certain definite graduation when in register with the index point will locate the guide and the axis of the object exactly parallel with the axis of the tool spindle to obtain the desired results. The stem of the valve may be held down on the guide and pressed forward to contact with the face of the wheel for the grinding operation. It will be observed that when the work head is positioned to secure a valve in the proper position for grinding its seating surface the guide 45 is located at right angles to the side of the grinding wheel. This permits the complete resurfacing of a valve without any angular readjustment of the work head. The standard taper of the valve seat being 45°, the guide is shown as making this angle with the axis of the work spindle 30.

A motor M supported by the bed 1 has a driving pulley 46 which is belted by a belt 47 to a pulley 48 on the end of the tool spindle, whereby according to the relative sizes of the pulleys the spindle may be rotated at a desired speed.

A belt tightener or tension device in the form of an idler pulley 50 is fixed to a sleeve 51 which is rotatable in a bearing support 52. The sleeve 51, while rotatable in the bearing 52, is held against longitudinal displacement therein by a flange 53 fixed thereto and the pulley 50 inasmuch as they are disposed at opposite ends of the bearing 52. The bearing 52 is removably secured onto the upper end of a supporting rod 54 which is slidable in a boss 55 fixed to the base so that the pulley may be moved up or down as may be desired to exert varying degrees of tension to the belt to maintain it in driving condition and so that the pulley is driven thereby. A set screw 56 threaded in the boss 55 is adapted to bind the rod against displacement and thereby retain the pulley in an adjusted position. Instead of the support for the tensioning idler pulley being adjustable for tensioning the belt, the motor M may be adjustable on the bed and may be accomplished by providing elongated openings M1 in the base of the motor for the clamping bolts M2. Or the bearing 40, as previously mentioned, may be adjustable on the bed. With such an arrangement, the motor or bearing 40 may be shifted so that the belt will be pulled against the tensioning idler which in that case may be stationary so as to exert a tension on the belt and also be driven thereby and function as a driver for the shaft 39. In any event, the tensioning idler is intended to drive the shaft 39 in the following manner.

An end 60 of the flexible shaft 39 is preferably slidable in the sleeve 51 and has a keyway or spline longitudinally thereof which receives a key or driver (not shown) fixed in the sleeve. By being slidable, as described, the work head, which is adjustable with respect to the bed and the other parts of the machine, may be moved and the shaft 39 caused to move back and forth with respect to the sleeve while the spline and driver connection insures a positive driving connection and accommodates itself to the sliding movement.

As will be observed, the tool spindle is driven by a belt which is tensioned by means which also serve as a driver for the work spindle. To this end, I not only eliminate a belt drive for the work spindle but utilize a necessary element, the idler for the tool spindle belt, to operate the work spindle and thereby produce a machine having all the desirable characteristics which is simple in construction and therefore low in cost.

The invention may be practiced in various ways without departing from the scope thereof and I prefer therefor to be limited, if at all, by the appended claims rather than by the foregoing description.

What I claim is:

1. A bench tool comprising a rotatable grinding wheel, a work carrying spindle angularly mounted with respect to the grinding wheel and adapted to hold and rotate a valve with its seating edge in contact with the periphery of the grinding wheel, and a guideway angularly mounted with relation to the work carrying spindle and adapted to receive the shank of the valve and to position it with its end square against the side of the grinding wheel.

2. A bench tool comprising a rotatable grinding wheel, a work head adjustably mounted laterally and angularly with respect to the grinding wheel, a work carrying spindle fixed for rotation in the work head and adapted when in one position of angular adjustment to present the seating face of a valve in proper angular grinding contact with the periphery of the grinding wheel and an open V-guide on the work head in fixed angular position with respect to the work head and adapted to present the end of a valve shank square against the side of the grinding wheel when the work head is in said position of angular adjustment, whereby the seating face of the valve and the end of the valve shank may both be ground without angular adjustment of the work head.

3. A bench tool comprising a base, a pair of round rods supported on the base, a slide having bearings slidable on the rods, a second pair of round rods at right angles to the first pair and supported on the slide, a second slide having bearings slidable on the second pair of rods, a work head rotatably adjustable on the second slide, means for holding each slide in adjusted position upon the rods, a tool head mounted on the base, and yieldable clamping members carried by the slides and operable on the under sides of the rods to insure smooth and accurate engagement between the slides and rods.

In testimony whereof I have affixed my signature.

CHARLES E. VAN NORMAN.